United States Patent
Poorman et al.

(10) Patent No.: US 9,896,739 B2
(45) Date of Patent: *Feb. 20, 2018

(54) SYSTEM AND METHOD FOR MELTING METAL CHIPS

(71) Applicant: ReMelt Scientific, Inc., Port Charlotte, FL (US)

(72) Inventors: Michael Alan Poorman, Port Charlotte, FL (US); Larry D. Areaux, Port Charlotte, FL (US)

(73) Assignee: ReMelt Scientific, Port Charlotte, FL (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/825,680

(22) Filed: Aug. 13, 2015

(65) Prior Publication Data

US 2015/0368751 A1    Dec. 24, 2015

Related U.S. Application Data

(63) Continuation of application No. 13/804,270, filed on Mar. 14, 2013, now Pat. No. 9,145,596.

(60) Provisional application No. 61/675,489, filed on Jul. 25, 2012, provisional application No. 61/667,953, filed on Jul. 4, 2012.

(51) Int. Cl.
   *C22B 7/00*   (2006.01)
   *C22B 21/00*  (2006.01)
   *C22B 1/02*   (2006.01)

(52) U.S. Cl.
   CPC .......... *C22B 21/0092* (2013.01); *C22B 1/02* (2013.01); *C22B 7/001* (2013.01); *C22B 7/003* (2013.01); *C22B 21/0069* (2013.01); *Y02P 10/214* (2015.11); *Y02P 10/218* (2015.11)

(58) Field of Classification Search
   CPC ...... C22B 7/001; C22B 7/003; C22B 21/0092
   See application file for complete search history.

(56) References Cited

U.S. PATENT DOCUMENTS

| | | | |
|---|---|---|---|
| 4,137,176 A | 1/1979 | Areaux et al. | |
| 4,186,096 A | 1/1980 | Areaux et al. | |
| 4,253,960 A | 3/1981 | Areaux et al. | |
| 4,310,417 A | 1/1982 | Areaux et al. | |
| 4,377,259 A | 3/1983 | Areaux et al. | |
| 4,424,891 A | 1/1984 | Areaux et al. | |
| 4,710,126 A | 12/1987 | Areaux et al. | |
| 4,721,457 A | 1/1988 | Areaux et al. | |
| 4,872,907 A | 10/1989 | Areaux | |

(Continued)

FOREIGN PATENT DOCUMENTS

| | | | |
|---|---|---|---|
| JP | 09031561 A | | 2/1997 |
| JP | 2008-169459 A | | 7/2008 |
| JP | 2008169459 A | * | 7/2008 |

*Primary Examiner* — George Wyszomierski
*Assistant Examiner* — Tima M McGuthry Banks
(74) *Attorney, Agent, or Firm* — Renner, Kenner; Arthur M. Reginelli

(57) ABSTRACT

In a process for melting metal chips, the process being of the type that uses a charge system for delivering the metal chips to a melt furnace, and of the type that uses a pre-treatment system for drying the metal chips, the improvement comprising the step of capturing an exhaust stream from the charge system, where the exhaust stream includes hydrocarbons, and combusting the hydrocarbons to produce heat that is utilized in drying the chips.

18 Claims, 11 Drawing Sheets

(56) References Cited

U.S. PATENT DOCUMENTS

| | | | |
|---|---|---|---|
| 5,203,910 A | 4/1993 | Areaux et al. | |
| 5,211,744 A * | 5/1993 | Areaux | C22B 9/16 |
| | | | 266/158 |
| 5,395,094 A | 3/1995 | Areaux | |
| 5,395,424 A | 3/1995 | Areaux | |
| 5,397,378 A | 3/1995 | Areaux | |
| 5,403,381 A | 4/1995 | Areaux | |
| 5,407,462 A | 4/1995 | Areaux | |
| 5,468,280 A | 11/1995 | Areaux | |
| 5,735,935 A | 4/1998 | Areaux | |
| 5,853,454 A | 12/1998 | Areaux | |
| 5,919,283 A * | 7/1999 | Areaux | C22B 9/16 |
| | | | 266/207 |
| 5,984,999 A | 11/1999 | Areaux | |
| 6,068,812 A | 5/2000 | Areaux et al. | |
| 6,893,607 B2 | 5/2005 | Areaux et al. | |
| 7,479,250 B1 | 1/2009 | Areaux et al. | |
| 9,145,596 B1 * | 9/2015 | Poorman | C22B 21/0069 |

* cited by examiner

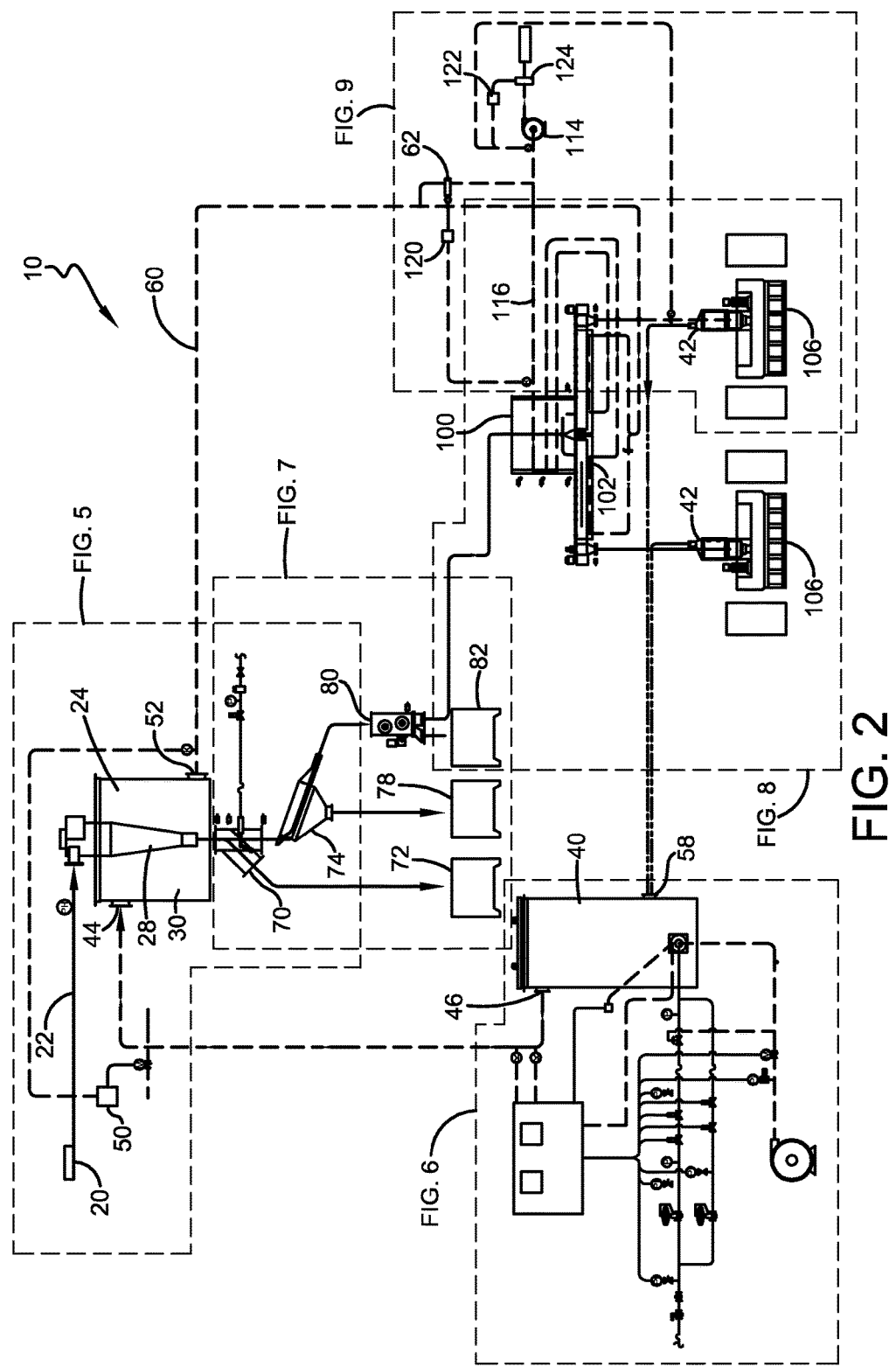

| | |
|---|---|
| RAL- ROTARY AIR LOCK | PROX- INDUCTIVE PROXIMITY SWITCH |
| SC- SCREW CONVEYOR | VFD- VARIABLE FREQUENCY DRIVE |
| TSC- TWIN SCREW CONVEYOR | SS- SOFT STARTER |
| SSC- SLUDGE SCREW CONVEYOR | M- ELECTRIC MOTOR |
| RM- RING MILL | HL- HIGH LEVEL |
| CTF- CENTRIFUGE | LV- LOW LEVEL |
| HOP- HOPPER | FS- FLOAT SWITCH |
| CYC- CYCLONE | $\varnothing$ - DIAMETER |
| DG- DIVERTER GATE | GPM- GALLONS PER MINUTE |
| PDG- PNEUMATIC DIVERTER GATE | (1 GPM=3.785 LITERS PER MINUTE) |
| ST- SLUDGE TANK | PSI- POUMD PER SQUARE INCH |
| SP- SLUDGE PUMP | (1 PSI= 6.89 KPA= 0.06895BAR) |
| PB- PNEUMATIC BLOWER | LBS/HR- POUNDS PER HOUR |
| DC- DRAG CONVEYOR | (1LB/HR= 0.4536 KG/HR) |
| OHC- OVERHEAD CONVEYOR | "HG- INCHES OF MERCURY |
| SB- STEEL BELT | (1 "HG= 3.386 KPA= 0.03386 BAR) |
| SFC- SHARK FIN CONVEYOR | CFM- CUBIC FEET PER MINUTE |
| BFV- BLACK FLUSH VALVE | (1 CFM= 0.2832 CUBIC METER PER MINUTE) |
| SV- SUCTION VALVE | "H20- INCHES OF WATER (1"H20= 2.54 CM H20) |
| BES- BAR END SEPARATOR | PRM- ROTATIONS PER MINUTE |
| BLS- BUBBLER LEVEL SENSOR | FPM- FEET PER MINUTE |
| PH- PHOTOHELIC PRESSURE SWITCH | (1 FPM= 0.03048 METERS PER MINUTE) |
| PS- PRESSURE SWITCH | HP- HORSEPOWER (1HP= 0.746 KW) |
| PTR- PRESSURE TRANSMITTER | GAL- GALLONS (1GAL= 3.785 LITERS) |
| LPP- POW PRESSURE COOLANT PUMP | "-INCHES (1"= 25.4 MM) |
| SOL- ELECTRIC SOLENOID | '- FEET (1'= 0.3048 M) |
| LS- LIMIT SWITCH | |

FIG. 3

SYMBOL LEGEND

| Symbol | Description |
|---|---|
| BUTTERFLY VALVE (SIZE) 8" | |
| CHECK VALVE (SIZE, DIRECTION) 8" | |
| BALL VALVE (SIZE) 1/2" | |
| GATE VALVE (SIZE) 1/2" | |
| SOLENOID VALVE (SIZE, SOLENOID#) SOL-36, 4" | |
| PRESSURE RELIEF VALVE (SIZE) 4" | |
| CENTRIFUGAL PUMP | |

| Line Type | Description |
|---|---|
| ———— | AIR LINE/PIPING |
| – – – – | FUME COLLECTION |
| — — — | PROCESS AIR |
| ———— | PRODUCT/CHIP FLOW |
| – – – – | CONTROLS CONNECTION |
| — — — | NATURAL GAS |
| ▸ | SPRAY NOZZLE |
| | PNEUMATICALLY OPERATED DIAPHRAGM PUMP |

| Symbol | Description |
|---|---|
| | AIR LINE FILTER, LUBRICATOR, REGULATOR |
| ⊘ | PRESSURE GAUGE (SIZE, CONNECTION, RANGE) |
| (PH) | PHOTOHELIC PRESSURE SWITCH |
| (P) | PRESSURE SWITCH |
| | PNEUMATIC/HYDRAULIC CYLINDER |

| Symbol | Description |
|---|---|
| □ | PROXIMITY SWITCH |
| | LINE SWITCH |
| | CONDUCTIVITY LEVEL SENSOR |
| | PRESSURE TRANSDUCER |
| | VACUUM TRANSDUCER |
| | INFRARED LEVEL SENSOR |
| | PADDLE LEVEL SENSOR |

SYSTEM AND METHOD FOR MELTING METAL CHIPS

This application is a continuation of U.S. Pat. No. 9,145,596 issued on Sep. 29, 2015, which claims the benefit of U.S. Provisional Application Ser. No. 61/667,953, filed Jul. 4, 2012 and 61/675,489, filed Jul. 25, 2013, which are incorporated herein by reference.

TECHNICAL FIELD

Embodiments of the invention generally relate to systems and methods for melting metal chips wherein by-product of the process is utilized to create heat that is utilized within the process. In an exemplary system and process, hydrocarbon material is captured from a vortex feed well that supplies a melting furnace, and the captured hydrocarbons are combusted to create heat that is used, at least in part, to dry the metal chips prior to delivery to the vortex well.

BACKGROUND INFORMATION

Metal chips, such as aluminum chips that are the by-product of machining aluminum castings used in the automotive industry, have the unique benefit of being able to be re-melted back into the same metal as they started. For example, casted aluminum automobile wheels are machined into final products requiring the use of machining coolant, and as a result of this process, a significant percentage of the casted aluminum is converted to scrap chips. A manufacturing company that produces thousands of aluminum wheels thus creates thousands of pounds of scrap metal that can be reused if properly melted.

Efficient re-melting processes require properly sized chips that are essentially free of moisture. Drying the chips is important because moisture can interfere with magnetic separation processes that are required to remove undesirable levels of contaminant metal such as iron. And, chips that are essentially free of moisture must be fed to the molten bath for at least safety reasons.

While dry unoxidized chips are desirable, drying the chips to remove moisture can be an expensive process. For example, in many commercial processes, aluminum chips are dried in a direct-fired rotary drum to remove the moisture prior to being introduced into the feed system of melt furnace. Direct-fired rotary drum drying, however, requires large quantities of heat energy.

And, it has been observed that some of the chips may be destroyed, prior to melting, by converting a significant percentage of the chips to aluminum oxides that must be removed from the furnace as waste. In other words, it is known that aluminum chips resulting from direct-fired processes produce lower yields of usable molten metal due to the formation of high percentages of aluminum oxides. Thus, some drying processes can cause an economic loss. Also, it has also been observed that direct-fired drying substantially removes residual oils from the chips prior to delivery to the feed system of the furnace.

One known system and method for more efficiently drying metal chips prior to melting them is disclosed in U.S. Pat. No. 4,721,457, which issued on Jan. 26, 1988 and which is incorporated herein by reference. This system employs the use of a centrifuge that uses centrifugal force to remove 80 to 90% of the moisture and oil from the chips before indirectly heating the chips to a level high enough to vaporize the remaining moisture while leaving an appreciable amount of the oil on the chips until they are charged into the feed system of a furnace where the oil is at least partially combusted. It is believed that the presence of these oils creates a reducing atmosphere within the furnace feed system, thereby reducing the formation of aluminum oxides.

SUMMARY OF THE INVENTION

One or more embodiments of the present invention provides a process for melting metal chips, the process being of the type that uses a charge system for delivering the metal chips to a melt furnace, and of the type that uses a pre-treatment system for drying the metal chips, the improvement comprising the step of capturing an exhaust stream from the charge system, where the exhaust stream includes hydrocarbons, and combusting the hydrocarbons to produce heat that is utilized in drying the chips.

One or more embodiments of the present invention further provides a process comprising the steps of: (i) providing metal chips having water and hydrocarbon on the surface of one or more of the chips; (ii) removing at least a portion of the water from the chips; (iii) delivering the chips to a charge system in fluid communication with a melt furnace, where the metal chips are exposed to heat within the charge system, and where the heat is sufficient to vaporize or at least partially combust the hydrocarbons and thereby create an exhaust stream including hydrocarbon therein; (iv) capturing the exhaust stream; (v) combusting the hydrocarbons within the exhaust stream to thereby create heat; and (vi) transferring the heat to metal chips having water and hydrocarbon on one or more of the chips.

One or more embodiments of the present invention further provides a process for melting metal chips, the process comprising the steps of: (i) charging metal chips to a melt furnace; (ii) capturing an exhaust stream generated by said step of charging, where said exhaust stream includes hydrocarbons; (iii) combusting the hydrocarbons to form heat; and (iv) transferring the heat to additional metal chips prior to charging the additional metal chips to the melt furnace.

One or more embodiments of the present invention further provides a process for charging aluminum chips having oil residue into a melt furnace through a vortex well while reducing the amount of aluminum oxide formed when the chips are added to the vortex well; the process comprising the steps of: (i) feeding the chips into the vortex well by dropping the aluminum chips through a portion of the atmosphere inside a fume hood that covers the vortex well, wherein the temperature inside the fume hood is high enough to at least vaporize the oil on the chips; (ii) controlling the volume of air input to the fume hood; (iii) capturing an exhaust stream generated by said step of feeding, where said exhaust stream includes hydrocarbons.

One or more embodiments of the present invention further provides a process for melting chips, the process being of the type that uses a charge system for delivering the metal chips to a melt furnace, the improvement comprising the step of automatically controlling the delivery of the chips into the furnace at a feed rate determined by the temperature of the molten metal in the furnace.

BRIEF DESCRIPTION OF THE DRAWINGS

FIG. 2 is a schematic of another exemplary configuration of the system for multiple vortex wells.

FIG. 3 is a legend for the abbreviations used in FIGS. 5-11.

FIG. 4 is a legend for the symbols used in FIGS. 5-11.

Similar reference numbers refer to similar parts throughout the specification.

DETAILED DESCRIPTION

Figure 1:
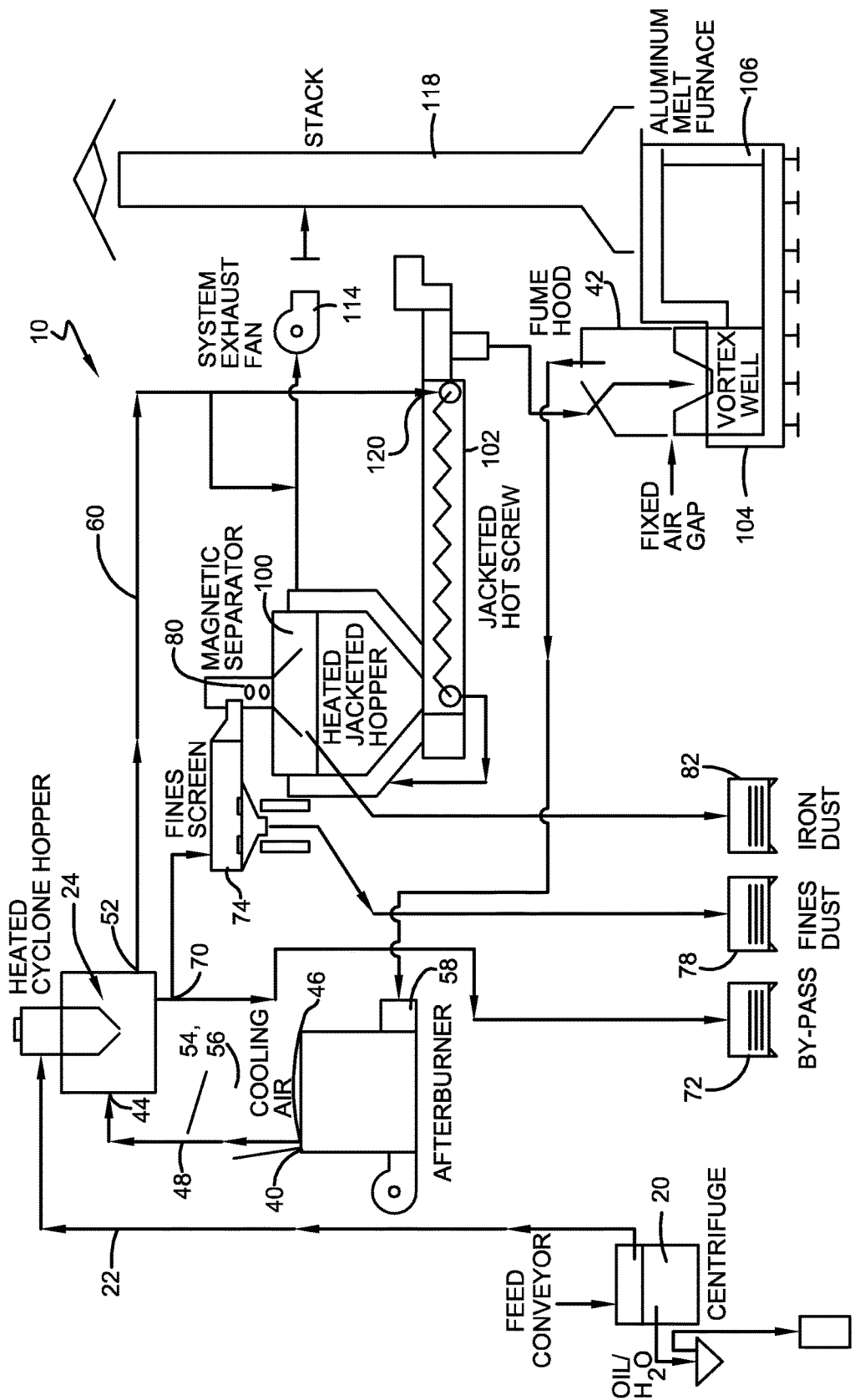
FIG. 1 is a schematic of one exemplary configuration of the system for a single vortex well.

Embodiments of the invention generally provide a system and method for drying and introducing metal chips into a mechanism for melting the metal chips. In an exemplary configuration, the system and method introduces the metal chips into a melt furnace through a charge system, such as those known charge systems that include a vortex well. The system and method captures exhaust gases, and optionally heat energy, escaping from the charge system (e.g. vortex well). The exhaust gases are believed to include hydrocarbons or partially combusted hydrocarbons that can, according to certain embodiments, be used as a fuel source to produce heat that can be used to dry the metal chips by using, for example, indirect drying techniques. Also, it has unexpectedly been observed that the process of capturing the heat and exhaust gases creates an environment within the charge system that produces fewer metal oxides than would otherwise be expected within a similar charge system operating without the capture mechanism.

In one exemplary method, the present disclosure provides one or more of (1) at least one drying step, which may also be referred to as a pre-treatment step, whereby one or more drying elements apply indirect heat to metal chips carrying water and oil to thereby drive off or vaporize at least some of the water from the metal chips; (2) a feeding step whereby the metal chips dried in the drying step are conveyed to a charging mechanism; (3) a charging step whereby substantially dried metal chips are introduced to a melt furnace through the charging mechanism, which may include a vortex well; (4) an exhaust capturing step whereby exhaust gases emitted from the charging mechanism are captured; (5) an exhaust combusting step whereby partially combusted hydrocarbons captured in the exhaust capturing step are further combusted to produce heat energy; and (6) a heat transfer step whereby heat produced by the exhaust combusting step is transferred to the one or more drying elements.

In one exemplary system, the present disclosure incorporates one or more of (1) at least one drying mechanisms that are adapted to apply indirect heat to metal chips that carry water and oil and thereby drive off an appreciable amount of the water while leaving an appreciable amount of oil on the chips; (2) a feed system to transfer the metal chips from the drying mechanisms; (3) a melt furnace adapted to receive the metal chips and process the same for the collection of usable materials, such as aluminum; (4) a furnace charge system in communication with the feed system and the furnace, the charge system adapted to receive the metal chips and deliver the metal chips into the furnace; (5) a capture device proximate to the charge system adapted to capture exhaust gases escaping from the feed system; (6) a pressure control system adapted to provide a negative pressure within the capture device to thereby allow air entering near the bottom of the capture device to route exhaust fumes leaving the charge system to an exit port within the capture device; (7) a combustion device for combusting uncombusted hydrocarbons captured by the capture device and convert the same to heat; and (8) one or more transfer elements transferring heat generated by the afterburner to the one or more drying mechanisms.

For example, in certain embodiments, the system may include one or more of (1) an indirectly heated reservoir, (2) a jacketed, indirectly-heated furnace charge conveyor or conveyors, (3) a combustion device for the combustion of captured exhaust gases, (4) a heat transport system to utilize the exhaust gases from the afterburner to transfer heat to one or more elements of the system, (5) a close-capture fume hood to contain and capture the flame, smoke, and fume that ignites above the molten bath, (6) a pressure control system that provides a slight negative pressure within the fume hood to allow only enough air to enter near or at the bottom of the fume hood to adequately capture all smoke and fume while providing air for incomplete combustion of the oils contained on the metal chips, (7) a device or devices that produce a controlled atmosphere within the fume hood that eliminates or greatly reduces the formation of oxidized chips that enter the fume hood from a sealed hole in the top or side of a fume hood, (8) a side well attached to a melt furnace with the side well having an open top for the introduction of metal chips, and (9) a molten metal circulation device that promotes the movement of molten metal from the main heat chamber of the furnace to the side well where within a circulating well, often referred to as a vortex well, the chips are charged for submerged melting.

In one or more embodiments, the feed system includes heated screws and/or one or more heated hoppers. In one or more embodiments, the feed system carries chips from the drying system to the charge system. In one or more embodiments, the charge system includes a circulation system that is adapted to move molten metal from the furnace into a charge vessel where the metal chips are introduced with molten metal. Additionally, the circulation system adapted to carry the chips, which are introduced with the molten metal, into the furnace. In other words, the charge system may include a circulation loop in communication with the furnace and a charge location, such as a vortex well, where molten metal and chips are first introduced. Various charge systems are known in the art, and practice of the present invention is not necessarily limited by the type of charge system employed.

In one or more embodiments, the combustion device is an afterburner. Conventionally, afterburners include several layers of refractory brick and include an internal volume that is in fluid communication with an inlet and an outlet. The temperature within the internal volume is at least 1200 F, or in some embodiments, at least 1400 F, and is sized accommodate the captured exhaust gases for a time sufficient to fully combust or substantially combust the hydrocarbon material within the captured exhaust stream. In other embodiments, the combustion device may be the exhaust system of the melt furnace if the exhaust system is suitably sized for the purpose of taking the place of an afterburner.

Another exemplary configuration of the system and method increases the capacity of the system allowing it to serve two melt furnaces. In this configuration, the jacketed heated hopper is designed to discharge into two jacketed heated screws. Each screw independently heats up and feeds chips to a melt furnace. Each hot screw is operated automatically by control signals received by the furnace controls that it serves. The hot screws are "turned on" delivering chips to the vortex wells of each furnace as long as three parameters are being met: (1) less than high molten metal level in the furnace; (2) temperature of the molten metal is above a minimum set point; and (3) the furnace combustion system is on. In this configuration, the afterburner receives fumes from two fume hoods and both fume hoods provide a controlled reducing environment to reduce undesirable oxidation.

One embodiment of the present disclosure, which can be used in conjunction with those aspects of the invention that capture exhaust fumes from the charge system, or which may be used alone in any melting process (e.g., aluminum melting process), includes an automatic feed system. This automatic feed system advantageously delivers chips, using mechanisms know in the art and/or described here, to the charge system (e.g., a vortex charge system) as a function of the furnace temperature. More specifically, delivery of heated chips to the furnace charge well is accomplished at a feed rate that is proportional to the molten metal temperature within the furnace. Where the temperature of the metal within the furnace is at a higher temperature, the feed rate is automatically increased. Where the temperature of the metal within the furnace is at a lower temperature, the feed rate is automatically reduced. For example, a slaved control that can obtain a signal (e.g., 4 to 20 milliamp signal) from the furnace's temperature controller can be provided. This control can provide a proportional variable feed rate from a minimum setting where the furnace's molten metal temperature is, for example, 737° C. to a maximum setting or speed when the furnace temperature is, for example, 760° C.

Another configuration interposes a magnetic separator operatively between a screening apparatus and a heated hopper. The screening apparatus is downstream of an initial hot cyclone chamber that initially dries the chips. Locating the magnetic separator upstream of the heated hopper increases the effectiveness of the magnetic separation as most magnetic separation is not effective at elevated temperatures. Separating the drying and heating operations allows the magnetic separation to occur before the temperature of the chips is significantly raised.

In one or more embodiments, the negative pressure in the fume hood or hoods may be controlled and maintained by using a sensing device that receives the negative pressure signal, converts it to an output signal and controls an opposed blade outlet damper on the main system exhaust fan.

In one or more embodiments, the system and method provides for the drying of metal chips so that they do not require independent drying prior to being remelted. An indirectly heated hopper stores and elevates the temperature of the chips. The final drying of chips is effected in a jacketed rotary drum dryer or jacketed screw conveyor heated by products of combustion from the exhaust of the afterburner, which exhaust is routed to the heated cyclone.

In one or more embodiments, the overall process of the present invention dries the metal chips in a manner that minimizes destruction, such as may occur through the vaporization of the oil, during the drying process. For example, in one or more embodiments, aluminum chips are delivered to the centrifuge process together with about 10% by weight liquid (based upon the total weight of the metal chips and the liquid); about 1-2% by weight of the total chip is oil and about 8-9% by weight of the total chip is water. After the chips are dewatered in the centrifuge, the total water and oil content (i.e. total liquid) is reduced to about 1-2% by weight of the total chip, of which about 25%-50% of the liquid is oil (i.e. 0.25 to 0.5% by weight of the total chip is oil). After complete drying, which substantially removes all of the water, the chips contain about 0.25 to 0.5% by weight oil.

In one or more embodiments, the system and method provides for the use of a close-capture fume hood that provides for controlled burning of the oil. It is believed that the conditions within the hood provide a reducing atmosphere that significantly reduces the formation of aluminum oxide (AL2O3) in the vortex well. The controlled burning reduces the amount of oxygen available for the oxidation of the metal. A pressure control system is employed to maintain the reducing condition in the fume hood. The features above may be used alone and in combination to define unique configurations.

In one or more embodiments, the conditions within the close-capture fume hood are maintained at an air to oil ratio of less than 10 parts air to 1 part oil (which is carried by the chips), in other embodiments less than 9 parts air to 1 part oil, and in other embodiments less than 8 parts air to 1 part oil. In these or other embodiments, the conditions within the close-capture fume hood are maintained at an air to oxygen weight ratio of more than 6 parts air to 1 part oil, in other embodiments more than 7 parts air to 1 part oil, and in other embodiments more than 7.5 parts air to 1 part oil. In one or more embodiments, the conditions within the close-capture fume hood are maintained at an air to oil ratio from about 6 to about 10 parts air, in other embodiments from about 7 to about 9 parts air, and in other embodiments from about 7.5 to about 8 parts air to 1 part oil. As those skilled in the art will appreciate after reading this disclosure, the air to oil ratio can be adjusted by adjusting the opening between the charging device (e.g. the well) and the capture device. For example, in one embodiment, where a hood having a diameter of about 20 inches is positioned over a vortex well having about the same diameter, a gap of about 0.5 inch is provided between the well and hood. Where greater volumes of air are desired, the gap can be increased. Where lower volumes of air are desired, the gap can be decreased. Those skilled in the art will appreciate that the oil carried by the chips is at least partially converted to smaller hydrocarbons and those smaller hydrocarbons are carried into the fume hood together with vaporized oils, and therefore reference to the air to oil ratio within the hood will be understood to include, as the oil component, all hydrocarbon materials within the exhaust stream that derive from the oil carried by the chips.

In one or more embodiments, the air permitted within the close-capture hood is regulated based upon the amount of oil introduced into the well, which oil is introduced into the well by the metal chips. As should be appreciated, the amount of oxygen permitted into the hood is regulated to achieve the air to fuel ratio set forth above. As those skilled in the art appreciate, the partial combustion of the oil within the vortex well and/or within the capture device consumes oxygen. Where greater amounts of oil are present on the chips, greater amounts of oxygen are required. Conversely, where the chips carry less oil, lesser amounts of oxygen are required.

In one or more embodiments, the close-capture hood, or other duct work extending from the close-capture hood, may include an oxygen sensor to monitor the oxygen content of the exhaust gases exiting the hood. Based upon information obtained from this sensor, the air allowed into the hood, which air enters through the gap between the vortex well and the hood, can be adjusted to provide the desired amount of oxygen above the vortex well.

In one or more embodiments, the velocity of the of the air entering the hood (which air may enter between the gap between the capture hood and the vortex well itself) enters at a velocity of at least 150 feet per minute, in other embodiments at least 155 feet per minute, and in other embodiments at least 160 feet per minute.

Turning now to the drawings, the different configurations of the system for introducing metal chips for melting are generally indicated by the reference numeral 10. The methods of the disclosure are described with respect to the operation of systems 10. One exemplary configuration for a single vortex well is depicted in FIG. 1 with another exemplary configuration for multiple vortex wells is depicted in FIG. 2. System 10 and the method of introducing metal chips for melting described below at least partially utilized energy created from the combustions of captured exhaust gases to at least partially dry the metal chips prior to charging the chips to the furnace. This energy can also be used to heat the chips prior to charging the chips into the furnace. In certain embodiments, heat captured from the melting of the chips is used to pre-treat the chips prior to charging the chips to furnace (e.g. the charge system of the furnace). System 10 may be used with different types of metal chips including, but not limited to, brass and aluminum chips. The exemplary configuration described below use aluminum chips.

The raw chips, which may carry water and oil residues from one or more various machining processes, are introduced to into system 10 and do not require prewashing or pre-cleaning. Raw chips are fed into a centrifuge 20 to remove an initial amount of liquid. A conveyor 22 delivers chips from centrifuge 20 into a heated cyclone assembly 24. Centrifuge 20 removes 80 to 90 percent of the moisture by weight from the metal chips. Conveyor 22 may be a pneumatic conveyor that supplies the chips from a centrifuge 24.

Heated cyclone assembly 24 includes a cyclone 28 surrounded by a hot cyclone chamber 30. Heated cyclone assembly 24 initially heats and dries the chips with the heat delivered to the hot cyclone chamber from an afterburner 40 that is fed from a fume hood 42. Walls of cyclone are heated up to 550 degrees Fahrenheit. The temperature is intended to be low enough as to not burn the oil carried on the chips. The evaporation of the water on the chips cools the chips such that they exit assembly 24 relatively cool.

Figure 5:
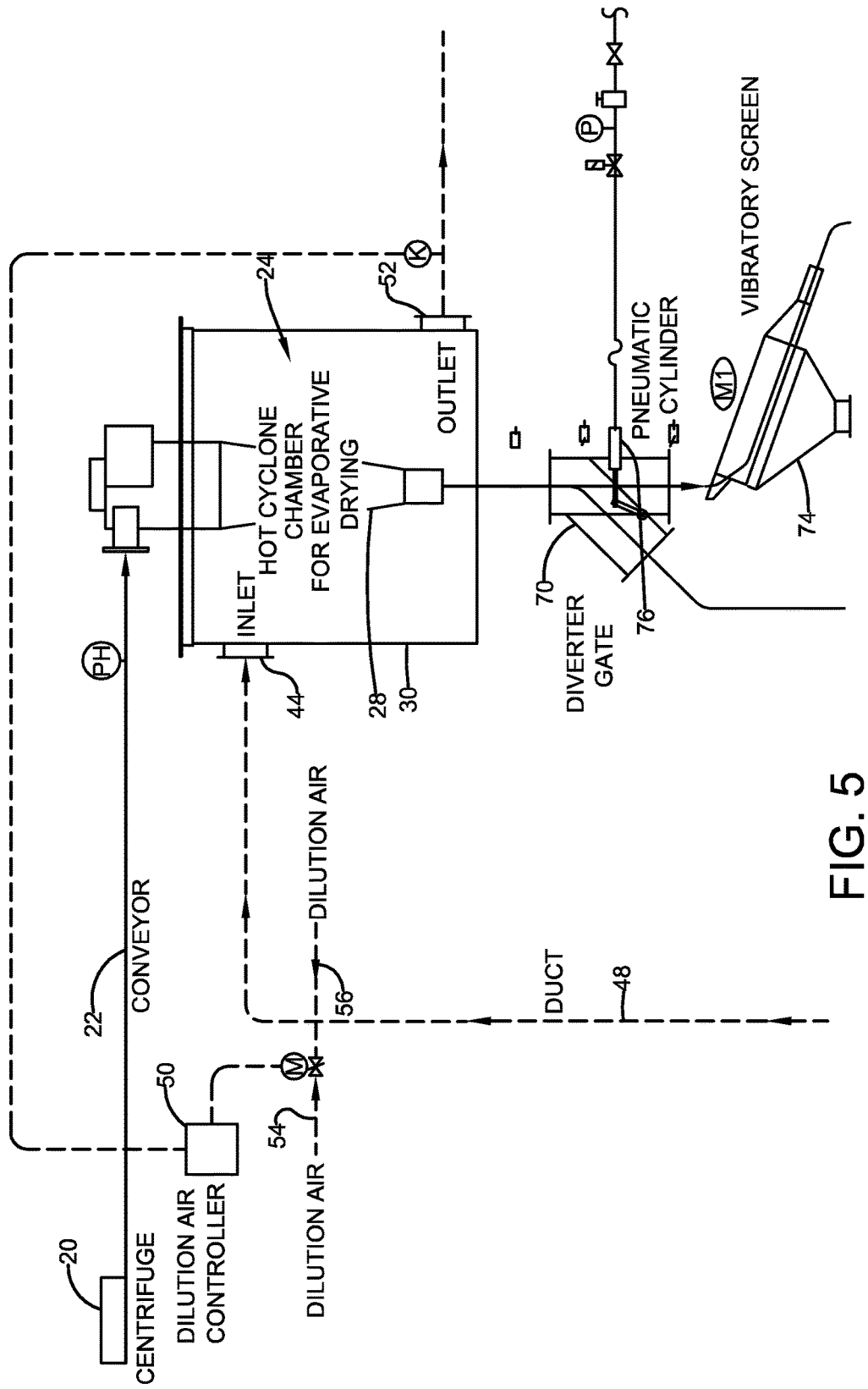
FIG. 5 is an enlarged view of the encircled section of FIG. 2 labeled with the FIG. 5 indicator.
Figure 6:
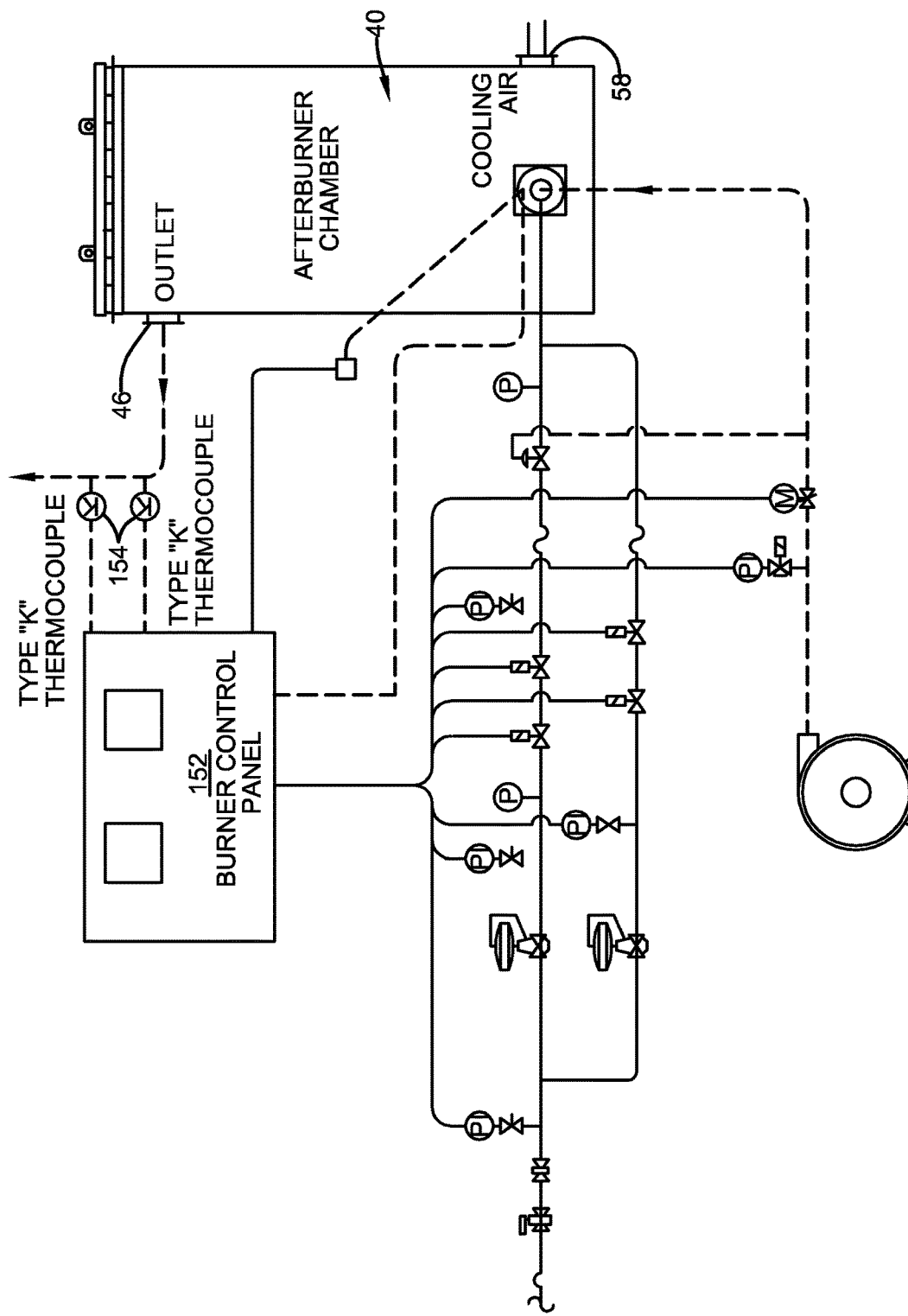
FIG. 6 is an enlarged view of the encircled section of FIG. 2 labeled with the FIG. 6 indicator.
Figure 7:
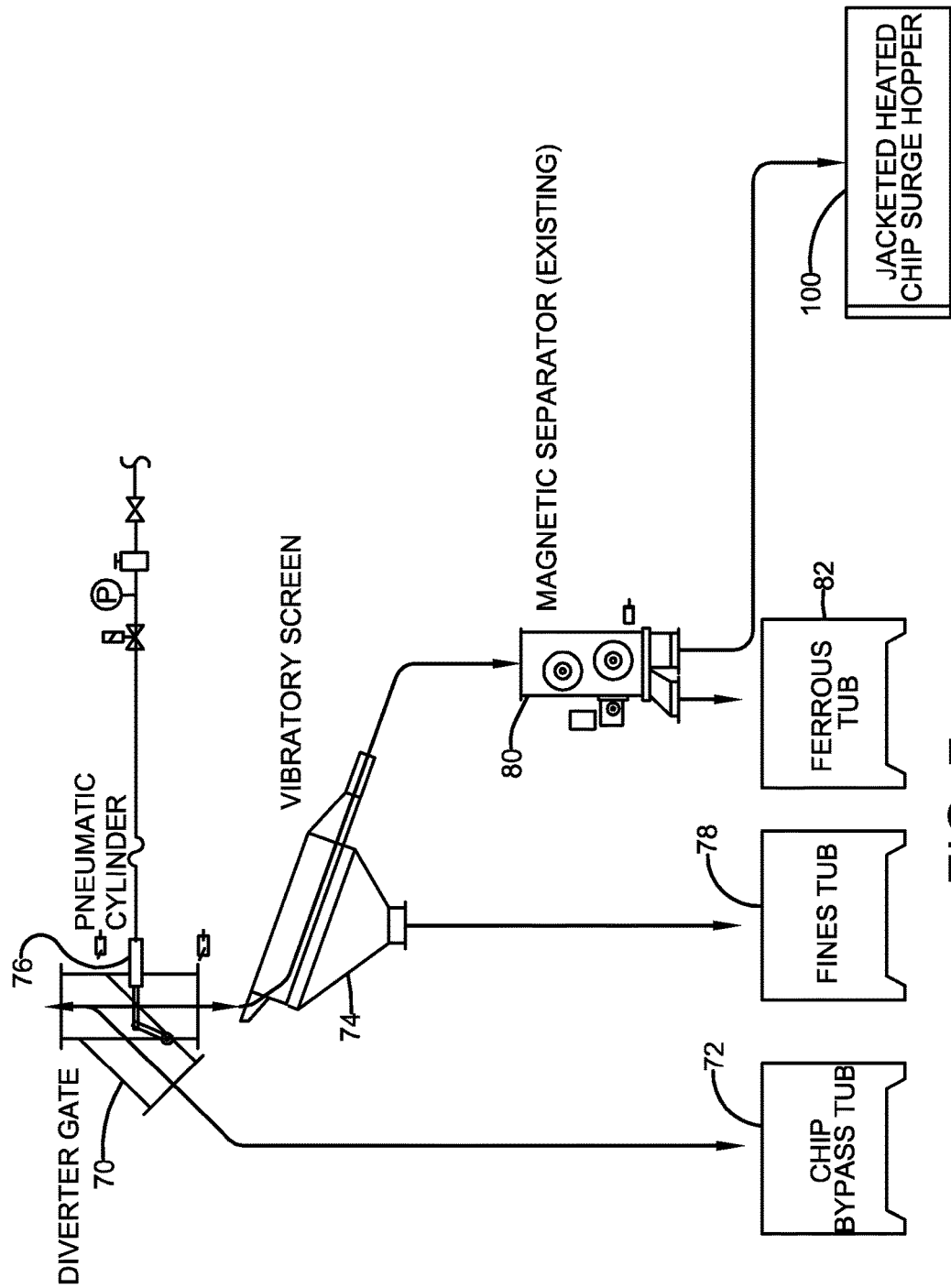
FIG. 7 is an enlarged view of the encircled section of FIG. 2 labeled with the FIG. 7 indicator.
Figure 8:
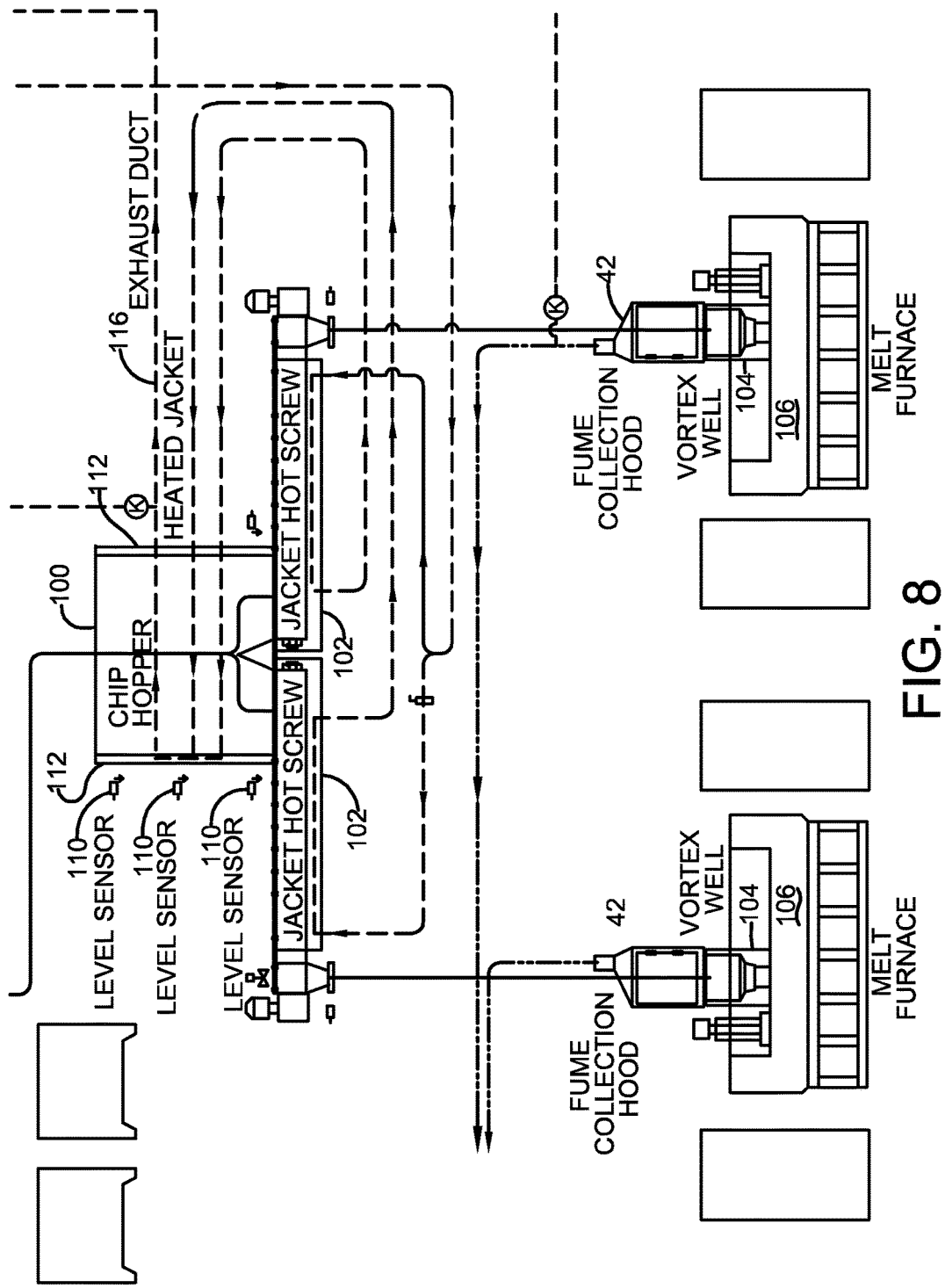
FIG. 8 is an enlarged view of the encircled section of FIG. 2 labeled with the FIG. 8 indicator.
Figure 9:
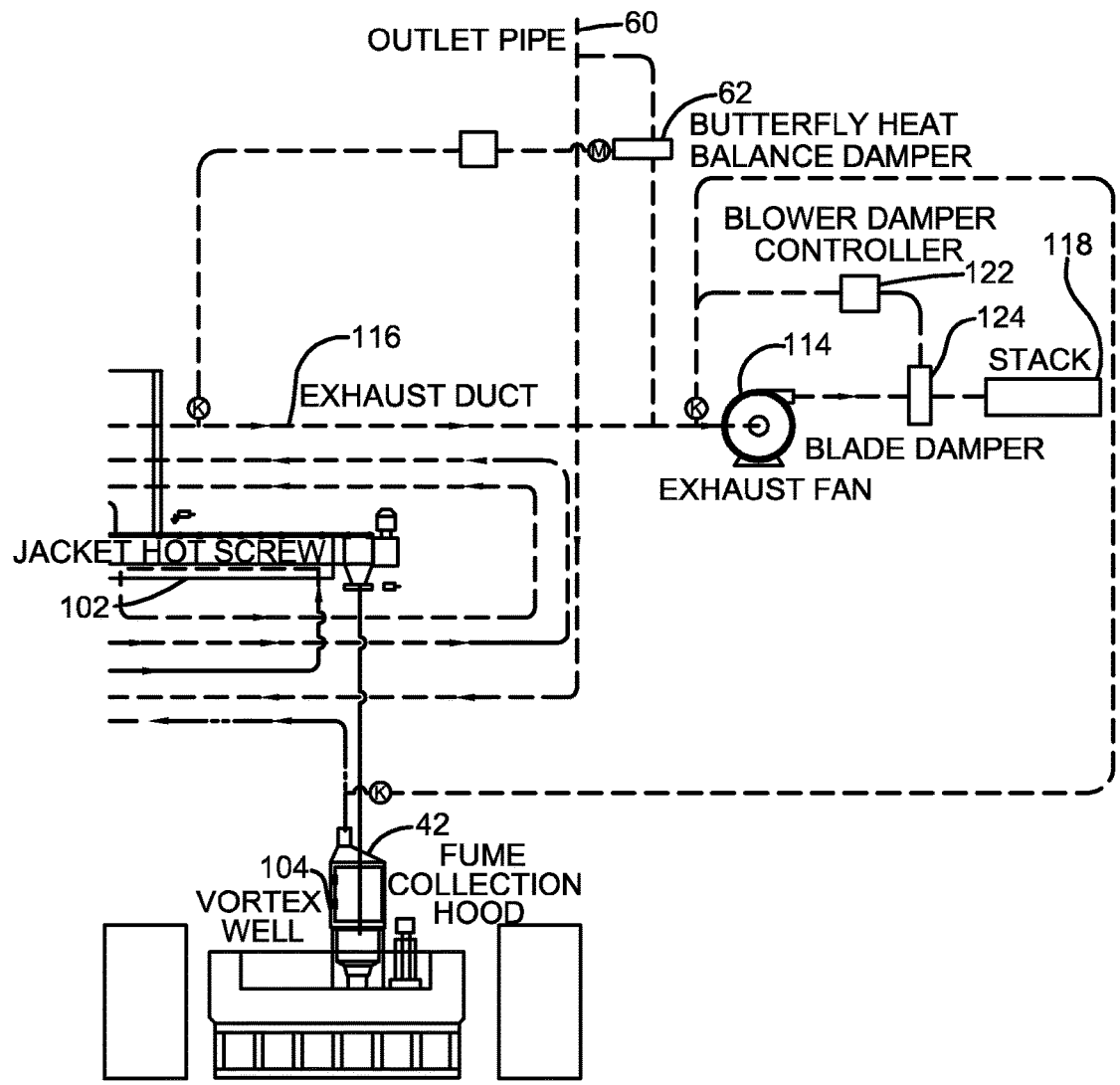
FIG. 9 is an enlarged view of the encircled section of FIG. 2 labeled with the FIG. 9 indicator.
Figure 10:
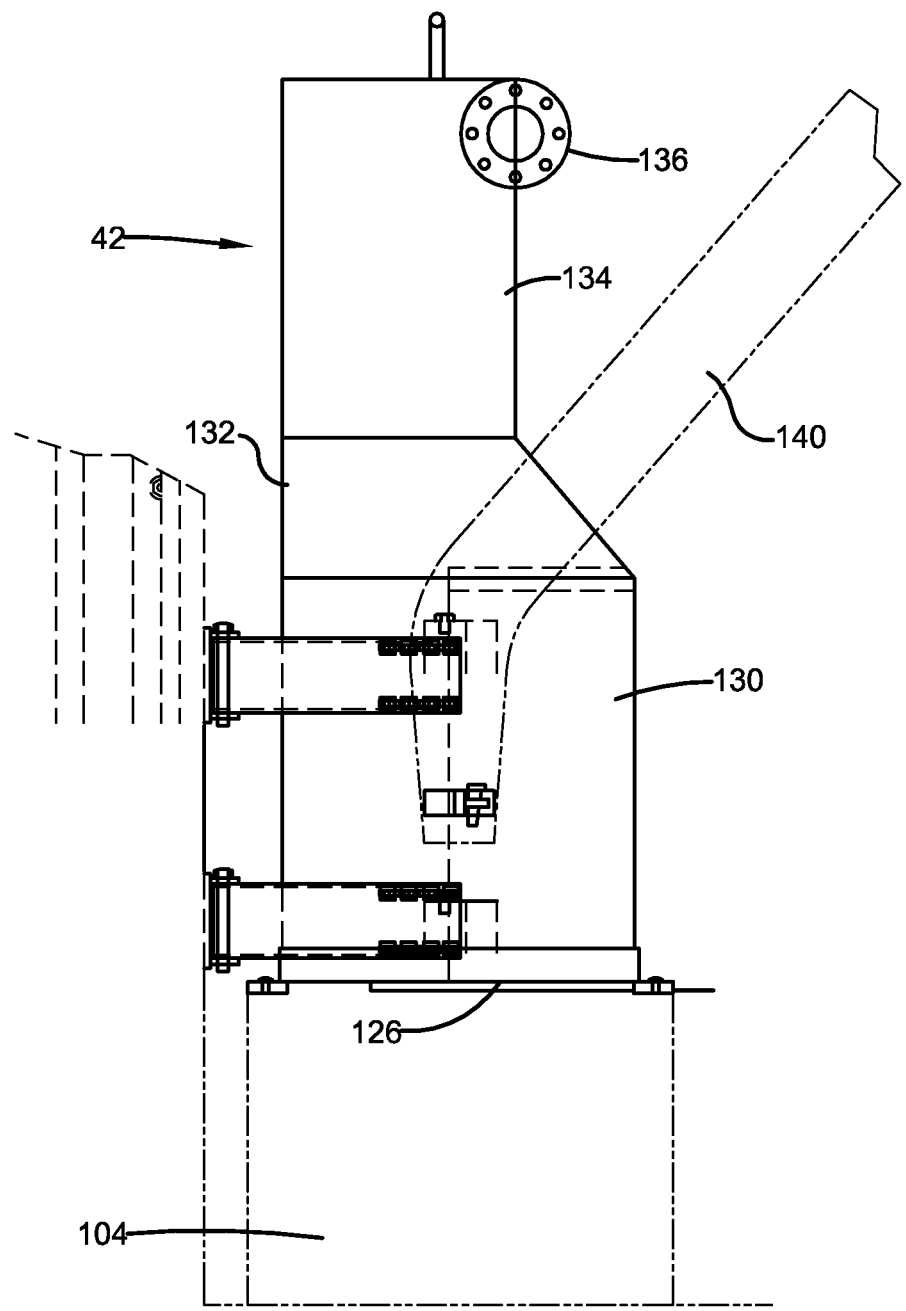
FIG. 10 is a side elevation view of the fume hood.
Figure 11:
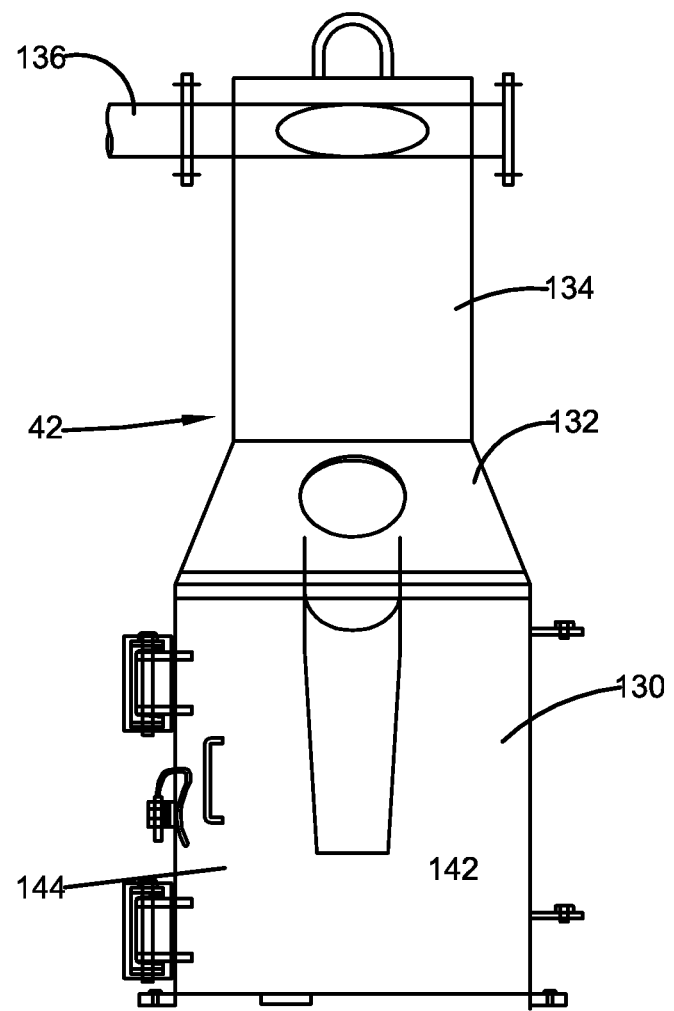
FIG. 11 is a front elevation view of the fume hood.

In one configuration, the afterburner gases are provided at about 1400 degrees Fahrenheit and these are cooled and delivered at about 550 degrees Fahrenheit to chamber 30 through an inlet 44 that communicates with the outlet 46 of afterburner 40 through a refractory lined duct 48 that rated at 4410 actual cubic foot per minute (ACFM) and may be 12×15 inches. As shown in FIG. 5, dilution air 54 may be provided to duct 48 by a dilution air controller 50 that monitors the temperature of the gas near the outlet 52 of chamber 30. A second passive source 56 of fresh air also may be provided in direct communication with duct 48. Outlet 52 is connected with an insulated outlet pipe 60 rated at 4410 ACFM with the outlet gases being about 520 degrees Fahrenheit. Outlet pipe 60 delivers the heated gases to further dry and heat the chips at a location downstream of cyclone 26 as described below. The flow through outlet pipe 60 may be split with a butterfly heat balance damper 62 as described below.

The heated chips exit cyclone 20 and pass through a diverter gate 70 that allows chips to be diverted into a chip bypass tub 72 or continue into a screening apparatus 74. Diverter gate 70 is controlled with a pneumatic cylinder 76.

One configuration of screening apparatus 74 is a vibratory screen driven by a motor. Screening apparatus 74 uses a screen that separates the fine metal chips from larger metal chips depending on the desired input size for the aluminum melt furnace or the desired fine size to be collected by the user of system 10. A fines tub 78 collects the separated fine chips.

The chips exit screening apparatus 74 and enter a magnetic separator 80 which removes ferrous chips to a ferrous tub 82 while allowing the non-ferrous chips to continue to a jacketed heated chip surge hopper 100.

The chips are held in hopper 100 until they are delivered into one or more jacket hot screw conveyors 102 for the final drying and heating before being delivered to a vortex well 104 connected to a melt furnace 106.

Hopper 100 holds the heated chips prior to their final drying and heating which occurs in the screw conveyors. A plurality of level sensors 110 are provided to monitor the height of the chips in hopper 100. A heated jacket 112 is disposed about hopper 100. Jacket 112 is heated with the outlet flow from conveyor(s) 102 and then delivers the used heated gases to an exhaust fan 114 through an exhaust duct 116 that is also connected with damper 62. Exhaust fan 114 sends the gas flow to the stack 118 of melt furnace 106. A heat balance damper controller 120 controls damper 62 based on temperature readings from duct 116. A blower damper controller 122 monitors the pressure and/or temperature of the gas flow into exhaust fan 114. In certain embodiments, the monitoring of pressure and/or temperature takes place within duct 116. In certain embodiments, the pressure in fume hood 42 controls a blade damper 124 disposed in line with exhaust fan 114 to maintain a negative pressure in fume hood 42. Controlling the pressure and the oxygen inside hood 42 provides for controlled burning of the oil vapor above the surface of the molten metal which maintains under most conditions a reducing atmosphere that significantly reduces the formation for aluminum oxide on aluminum chips in the vortex well.

As noted above, the exhaust gas flow from chamber 30 is delivered through duct 60 to further heat and dry the chips. This heating and drying is performed in jacket hot screw conveyor(s) 102 which are fed from hopper 100. An inlet duct 120 delivers the hot gases around the screw of the conveyor 102 and the exhausted gases from each conveyor 102 are delivered to hopper 100 as noted above. Each screw 102 is activated by signals from the furnace 106 it serves. Screw 102 is activated when there is less than high molten level in furnace 106, the temperature of the molten metal in furnace 106 is above a minimum set point, and the furnace combustion system is on.

Fume collection hood 42 provides the gases and at least partially burned oils to inlet 58 of afterburner 40. Fume collection hood 42 has a lower section 130 sized to cover the top of vortex well 104, an angled intermediate section 132 that receives the pretreated chips, and an upper section 134 that exhausts the fumes to the afterburner supply piping 136. The pretreated metal chips are delivered from screw conveyor 102 through a chip supply pipe 140 that passes through hood 42 such that the outlet 142 of pipe 140 is directly above the centerline of the inlet to vortex well 104. Pipe 140 passes through the angled wall of angled section 132 such that the metal chips are delivered to vortex well 104 through a portion of hood 42. An access door 144 is provided in one wall of fume collection hood 42. Aside from the gap that allows the introduction of air, hood 42 is otherwise sealed with continuous welds to prevent fumes from leaking out of hood 42. This configuration of fume hood 42 causes the metal chips and any oil still carried on the metal chips to fall from a height through the atmosphere inside fume hood 42 which is heated by vortex well 104 to a temperature that allows for combustion of the oil when oxygen is available. The atmosphere inside fume collection hood 42 is controlled with exhaust fan 114 and blade damper 124. The percentage of oxygen inside fume hood 42 may be less than the percentage of oxygen found in the air. The oxygen content may be reduced to 16 to 18 percent of the air inside fume hood 42. A fixed air gap 126 is maintained between hood 42 and vortex well 104 so that air may be drawn into fume collection hood 42 at a controlled rate and such that the atmosphere inside fume hood 42 is maintained at a negative pressure. This limits the amount of oxygen inside the fume hood. Some of the oxygen available inside fume hood 42 is readily used to burn or partially burn the oil carried by the metal chips and thus leave less oxygen inside fume hood 42 to oxidize the metal chips.

The burned and partially burned oil materials, which may be referred to as hydrocarbons or partially combusted hydrocarbons, are delivered as fuel to afterburner 40 which reduces the amount of external fuel that must be added to afterburner 40. Afterburner 40 is fueled with natural gas or another suitable fuel through a fuel supply system 150 that is controlled with a burner controller 152. In one exemplary configuration, afterburner 40 includes a 1,500,000 BTU burner. Burner controller 152 monitors the temperature of the gas flowing out of outlet 46 with a pair of spaced thermocouples 154. Controller 152 is capable of increasing and decreasing the fuel and air supplied to afterburner 40 to control the flow in duct 48. Combustion air is supplied to afterburner 40 from a combustion blower 156 through a combustion air duct 158 that also communicates with fuel supply 150 through a duct 160.

Various modifications and alterations that do not depart from the scope and spirit of this invention will become apparent to those skilled in the art. This invention is not to be duly limited to the illustrative embodiments set forth herein.

What is claimed is:

1. A process for melting metal chips, the process comprising:
   (i) providing metal chips including a hydrocarbon and water on the surface of the metal chips;
   (ii) drying the chips to remove an appreciable amount of the water on the surface of the chips while leaving an appreciable amount of oil on the chips, where said step of drying includes a first substep of indirectly heating the chips to evaporate water, followed by a substep of magnetically separating ferrous compounds, followed by a substep of transferring the chips via a heated screw; and
   (iii) charging the metal chips to a charge system, where the charge system includes molten metal circulating between a melt furnace and the charge system.

2. The process of claim 1, where the charge system includes an atmosphere contained within a capture device located above a portion of the molten metal, the process further comprising the step of controlling the atmosphere within the charge system to ensure a reducing atmosphere.

3. The process of claim 2, where the hydrocarbon is oil, and where said step of controlling includes maintaining an air to oil ratio of less than 10 parts air to one part oil, where the oil is carried by the metal chips.

4. The process of claim 3, where said step of controlling includes maintaining an air to oil ratio of more than 6 parts air to one part oil.

5. The process of claim 2, where the hydrocarbon is oil, and where said step of controlling includes maintaining an air to oil ratio of less than 8 parts air to one part oil, where the oil is carried by the metal chips.

6. The process of claim 5, where said step of controlling includes maintaining an air to oil ratio of more than 7 parts air to one part oil.

7. The process of claim 2, where said charge system includes a well for receiving the metal chips, a capture device over said well, and an opening between said well and said capture device that allows air to enter the charge system, where said step of controlling includes adjusting the opening to thereby regulate the air entering the charge system.

8. The process of claim 1, where the metal chips include aluminum, and where the molten metal includes aluminum.

9. The process of claim 1, where, after said step of drying, the metal chips include from about 0.25 to about 0.5% by weight oil.

10. In a process for melting aluminum chips that uses a charge system for introducing aluminum chips to a molten metal, where the charge system includes molten aluminum therein, and said molten aluminum within said charge system circulates between the charge system and a melt furnace, the improvement comprising drying the chips at a temperature sufficient to vaporize water contained on the surface of the chips while maintaining the temperature sufficiently low to prevent substantial oxidation of the hydrocarbon contained on the surface of the chip to thereby provide dried aluminum chips containing hydrocarbon on the surface thereof, and then charging the dried aluminum chips to the charge system with hydrocarbon on the surface of the aluminum chips, whereby the hydrocarbon is at least partially oxidized within said charge system to thereby consume oxygen within the charge system.

11. A process comprising the steps of:
   (i) providing metal chips having water and hydrocarbon on a surface of one or more of the chips;
   (ii) removing at least a portion of the water from the chips to thereby provide metal chips including from about 0.25 to about 0.5 wt % hydrocarbon;
   (iii) removing ferrous compounds from the chips after said step of removing at least a portion of the water from the chips;
   (iv) storing the chips within a heated vessel;
   (v) delivering the chips to a charge system containing molten metal, where said step of delivering the chips includes maintaining the chips at a temperature above the vaporization temperature of water, where the charge system is in fluid communication with a melt furnace, where the metal chips are exposed to heat within the charge system, and where the heat is sufficient to vaporize or at least partially vaporize the hydrocarbon and thereby create an exhaust stream including hydrocarbon therein;
   (vi) capturing the exhaust stream; and
   (vii) combusting the hydrocarbon within the exhaust stream to thereby create heat.

12. The process of claim 11, where said step of capturing is accomplished with a fume hood.

13. The process of claim 11, where the metal chips are aluminum chips having hydrocarbon on a surface thereof, and where said chips include from 0.25 to 0.5% by weight oil on their surface after said step of removing a least a portion of the water and prior to said step of delivering the chips to a charge system.

14. The process of claim 11, where at least a portion of the water is removed within a centrifuge.

15. The process of claim 11, further comprising a step of drying the metal chips prior to delivering the chips to the charge system, where said step of drying employs an indirect heating mechanism.

16. A process for charging aluminum chips having oil residue, the process comprising the steps of:
 (i) providing aluminum chips that carry water and hydrocarbon on their surface;
 (ii) indirectly heating the aluminum chips to drive off the water and thereby provide aluminum chips that contain 0.25 to about 0.5 wt % hydrocarbon;
 (iii) subjecting the aluminum chips to magnetic separation following said step of indirectly heating;
 (iv) reheating the aluminum chips, after said step of subjecting the aluminum chips to magnetic separation, to thereby form heated aluminum chips;
 (v) feeding the heated aluminum chips into a well by dropping the aluminum chips through a portion of an atmosphere inside a fume hood that covers the well, wherein the temperature inside the fume hood is high enough to at least vaporize the oil on the chips, and where a volume of air is inputted into the hood;
 (vi) controlling the volume of air input to the fume hood; and
 (vii) capturing an exhaust stream generated by said step of feeding.

17. The process of claim 16, where the well includes molten metal in at least a portion thereof, and where said molten metal circulates between the well and a melt furnace, and where said step of feeding the chips into the well is automatically controlled at a feed rate determined by the temperature of the molten metal in the furnace.

18. A method for producing aluminum castings, the method comprising:
 (i) machining aluminum castings to produce aluminum chips mixed with ferrous-metal containing chips, said aluminum chips carrying hydrocarbon material and water on their surface;
 (ii) collecting at least a portion of the aluminum chips;
 (iii) indirectly heating the aluminum chips to remove an appreciable amount of water from the aluminum chips while leaving an appreciable amount of oil on the chips;
 (iv) following said step of indirectly heating the chips, magnetically separating the ferrous-metal containing chips;
 (v) following said step of magnetically separating, transferring the aluminum chips within a heated screw conveyor to a charge system containing molten metal, where the charge system is in fluid communication with a melt furnace, where the metal chips are exposed to heat within the charge system, and where the heat is sufficient to vaporize or at least partially combust the hydrocarbons on the surface of the metal chips;
 (vi) charging the aluminum chips to the furnace via said charge systems;
 (vii) melting the aluminum chips within the melt furnace to produce molten aluminum; and
 (viii) producing an aluminum casting with said molten aluminum.

* * * * *